No. 747,992. PATENTED DEC. 29, 1903.
I. M. MACY.
CAMERA SHUTTER.
APPLICATION FILED APR. 24, 1903.
NO MODEL. 2 SHEETS—SHEET 2.
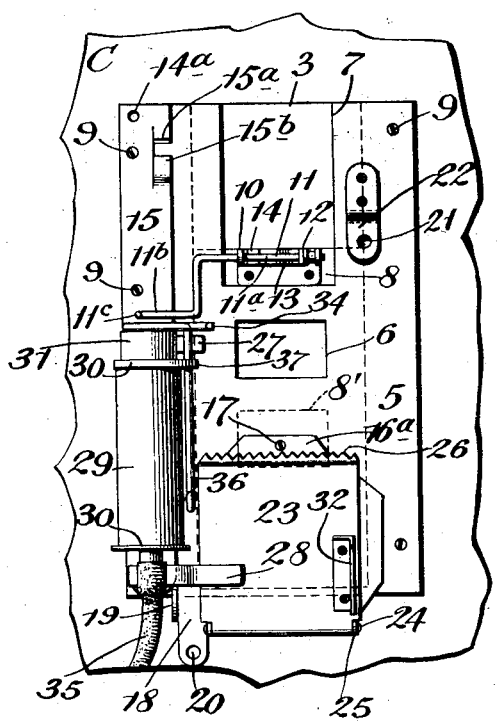
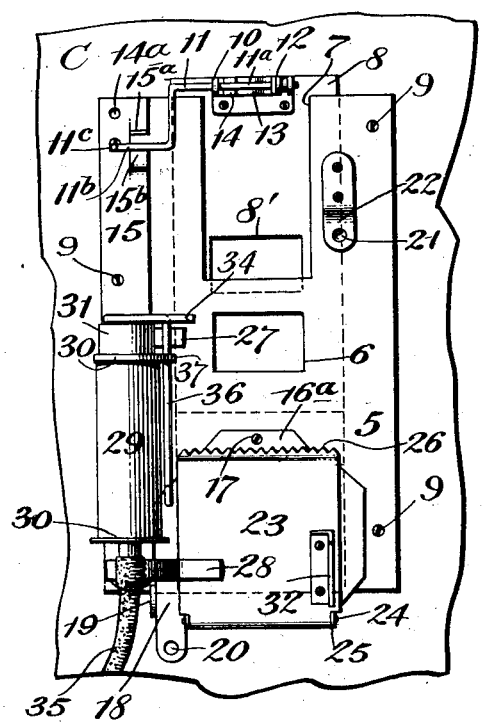
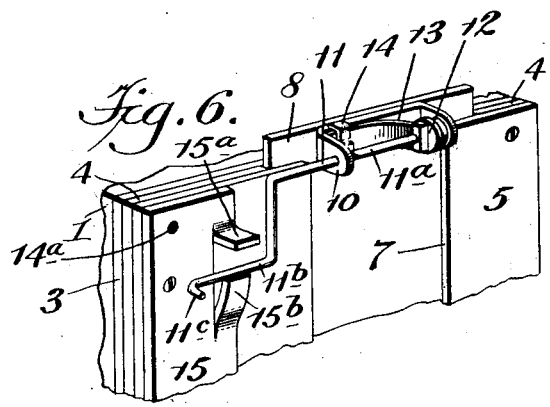
I. M. Macy, Inventor,
by C. A. Snow & Co.
Attorneys
Witnesses No. 747,992.  
Patented December 29, 1903.

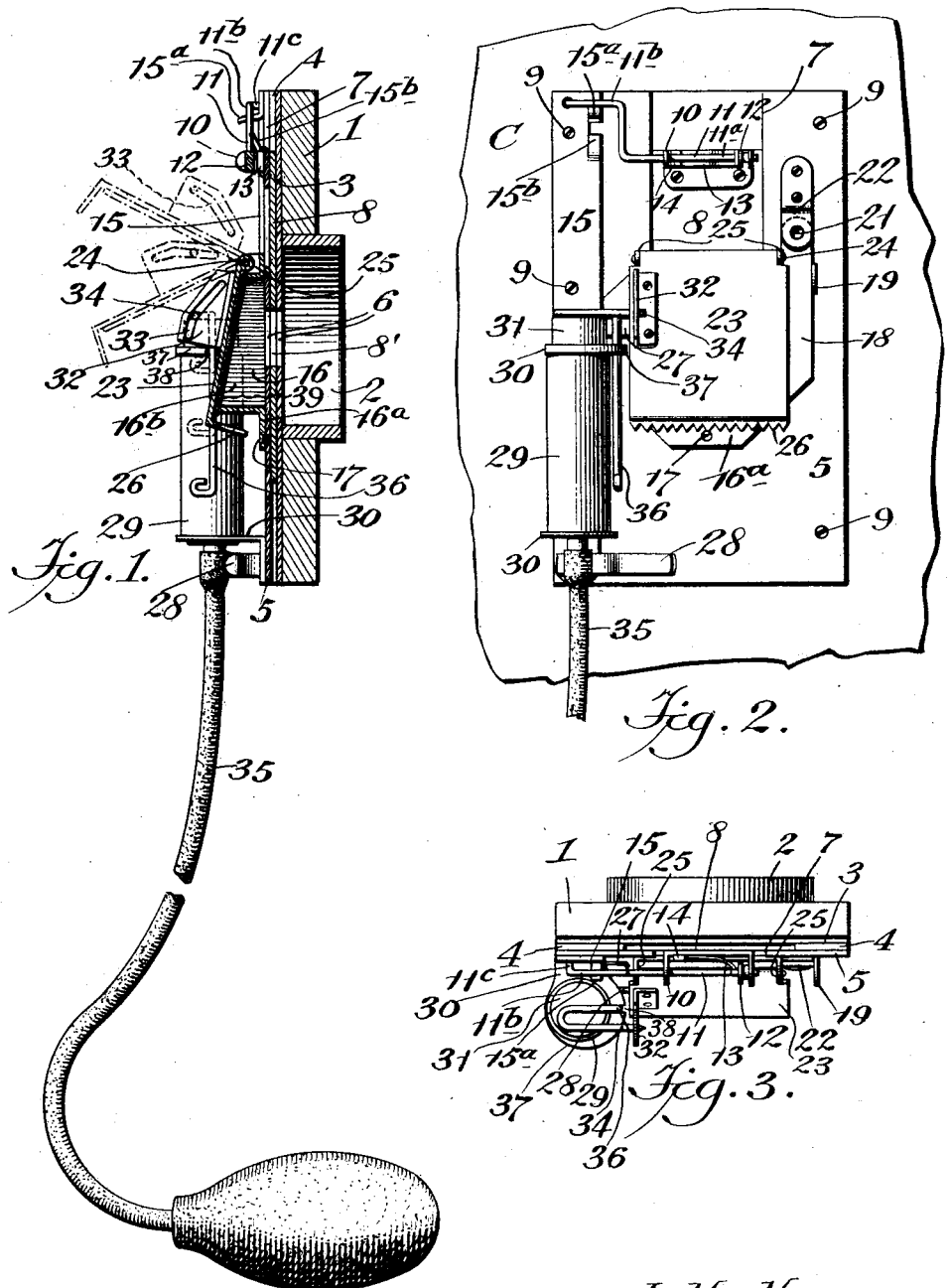

UNITED STATES PATENT OFFICE.

IRA M. MACY, OF NORFOLK, NEBRASKA.

CAMERA-SHUTTER.

SPECIFICATION forming part of Letters Patent No. 747,992, dated December 29, 1903.

Application filed April 24, 1903. Serial No. 154,155. (No model.)

*To all whom it may concern:*

Be it known that I, IRA M. MACY, a citizen of the United States, residing at Norfolk, in the county of Madison and State of Nebraska, have invented a new and useful Camera-Shutter, of which the following is a specification.

This invention relates to shutters for photographic cameras, and has for its object to provide an improved shutter mechanism in which the means for making time and instantaneous exposures are separate and by means of which the portion of the plate on which the light is weakest may be given a longer exposure than that on which the light is strongest.

A further object of the invention is to provide a shutter by means of which the light will be thrown upon the plate in such a way that the corners thereof will be fully illuminated and a portion of the light which with shutters of the ordinary type is admitted to the camera and is disadvantageous to the picture will be cut off.

With the objects above stated and others in view, which will appear as the invention is better understood, the same consists in the construction and combination of parts of a shutter hereinafter fully described, illustrated in the accompanying drawings, forming a part of this specification, in which corresponding parts are designated by the same characters of reference throughout and the novel features of which are pointed out in the appended claims.

In the drawings, Figure 1 is a view in vertical median section through the shutter and its supporting structure. Fig. 2 is a front elevation of the shutter as applied to a photographic camera, the time-exposure mechanism being in position over the opening in the shutter-frame and the shutter being closed. Fig. 3 is a top plan view of the shutter and supporting structure. Fig. 4 is a front elevation of the shutter as applied to a camera with the time-exposure mechanism in inoperative position and with the instantaneous-exposure mechanism in position ready for exposure. Fig. 5 is a front elevation of the shutter with the time-exposure mechanism in inoperative position and the instantaneous-exposure mechanism in the position taken after the exposure. Fig. 6 is a detail view in perspective showing the mechanism for locking the slide after an instantaneous exposure.

Referring to the drawings by reference characters, C represents the front board of a camera to which the shutter is attached by slipping the tubular bushing thereof over the lens-tube.

1 designates the base-board of the shutter, which is of wood and ordinarily of the thickness shown in the drawings. Centrally placed in the base-board is a circular opening, in which is secured a bushing 2, preferably of leather and of such size that it will fit closely around the lens-tube of the camera.

Fastened upon the front of the base-board 1 is a plate 3, of thin metal, preferably aluminium, and in front of the plate 3 and spaced therefrom by longitudinal strips 4 4 is a second plate 5. Plate 3 and plate 5 each have a rectangular opening 6 placed in registration and located at the center of the opening in the base-board 1. The plate 5 is also cut away at the top, as indicated at 7, to permit the vertical movement of a slide 8, also provided with a rectangular opening 8' of the same size as the openings 6. The slide 8 is of such width that it moves readily between the longitudinal strips 4 4 and is thin enough to lie between plates 3 and 5 without frictional engagement with either. Plates 3 and 5 and longitudinal strips 4 are all secured to the base-board 1 by means of screws 9, which extend through the said structures at the points shown.

Mounted on the slide 8 in a bracket 10 is a small crank-shaft 11, provided near one end with a block 12, rigidly secured thereto, which comprises a circular portion which contacts with one arm of the bracket 10 to prevent sliding of the shaft 11 in one direction through the bracket and a portion having two flat parallel sides adapted to engage with the end of the spring 13, attached to the base of the bracket by means of lugs 14. The spring 13 and block 12 form means for holding the crank-shaft yieldably in either of the positions shown in Figs. 2 and 6. The crank-shaft comprises a main portion $11^a$, which is rotatably mounted in bearings provided for it in the bracket 10, and a crank portion $11^b$ at the end of the shaft opposite that to which is attached the block 12. The crank portion 11[b] terminates in a lug 11[c], disposed at right angles to the member 11[b] and adapted to engage an opening 14[a] in the frame structure of the shutter, as shown.

Along the left side of the plate 5 near the upper portion is secured a strip 15, provided near its upper end with a stop-lug 15[a], projecting forward at right angles to the remainder of the strip, and an inclined catch-lug 15[b], disposed forward from the remainder of the strip and spaced a slight distance below the lug 15[a].

Pivotally mounted upon the plate 5 a little below the opening 6 therein is a frame 16, comprising a base portion 16[a] of somewhat irregular shape and a square flange 16[b], projecting forward from the base portion and having the upper portion thereof narrower than the lower portion, as best shown in Fig. 1, the side portions being of gradually-increasing width from the top to the bottom, as also shown in Fig. 1. The pivot 17, by means of which the frame is attached to plate 5, extends through the lower part of the base 16[a] and consists of a very short screw, which does not extend farther than the inner surface of the plate 5, so as not to form an obstruction to the movement of the slide 8. At the right-hand side of the base portion 16[a] is secured a light strip of metal 18, having a lug 19 at the outer margin thereof and an opening 20 near the upper end for engagement with a stud 21 on a spring-catch 22, which is firmly fastened to the plate 5, as shown. At the upper end of the base 16[a] is mounted a shutter-flap 23, which is attached to a shaft 24, journaled in bearings formed in two forwardly-turned lugs 25, made by bending forward portions of the base 16[a]. The lower margin of the shutter-flap 23 has attached or formed integral therewith a series of teeth 26, disposed at an angle to the remainder of the shutter and having the form of thin wedges, whose utility will hereinafter be explained. To aid the spring-catch 22 in holding the base 16[a] of the frame 16 in contact with the plate 5, I provide at the left side of the plate 5 just below the end of strip 15 a spring-clip 27, which engages with a portion of the base 16[a] when the frame 16 is in the position shown in Fig. 2.

In order to hold the frame 16 in the position shown in Figs. 4 and 5 and also to keep the flap 23 in closed position, the spring-clip 28 is provided at the lower end of plate 5, which is adapted to permit the passage thereunder of the frame and the flap, as shown in Figs. 4 and 5.

The means for operating the flap 23 when the frame 16 is in the position shown in Fig. 2 comprises a cylinder 29, mounted in brackets 30 at the left side of the frame structure of the shutter, a piston 31, slidably mounted in said cylinder, a plate 32, mounted on the flap 23 and provided with a cam-slot 33, and the arm 34, attached to the end of cylinder 31 and projecting through the cam-slot 33. Motion is imparted to the piston 31 by means of an ordinary bulb-tube 35, attached to the cylinder at its lower end, as shown, and the upward movement of the piston is limited by the contact of the curved end of a rod 36, attached to the end of the cylinder, with the flange 27 on the upper bracket 30. In order to keep the arm 34 in engagement with cam-slot 33 during the movement of the piston, the rod 36 is placed in a notch 38 in the flange 37 and serves as a guide for the movements of the piston, as well as the stop to check the upward movement thereof. To facilitate the entrance of arm 34 into cam-slot 33, the end of arm 34 is given a wedge shape, as seen in Figs. 4 and 5.

In order to prevent reflection from the inner surface of the flap 23 when open, I preferably line the flap with some black fabric 38—as, for example, black velvet—which has a non-reflecting dull surface and absorbs the light rays impinged thereon.

In using the shutter for time exposures the slide 8 is set in the position shown in Figs. 1 and 2, the lug 11[c] on the end of the crank-shaft 11 then being in engagement with the opening 14[a] and the opening 8[a] in the slide being in registration with the opening 6 in plates 3 and 5. The shutter-flap 23 lies normally in the position shown in full lines in Fig. 1, the non-reflecting lining thereof being in close contact with the flange 16[b] of the frame 16, and so excluding light from the lens. Pressure upon the bulb will cause the piston 31 to move upward in the cylinder 29, and the arm 34 at the upper end of the piston engaging with the cam-slot 33 in the plate 32, attached to the flap 23, will lift the flap forward and upward, as indicated in the positions shown in dotted lines in Fig. 1. If it is desired to give two portions of the plate equal exposure, the bulb will be pressed sufficiently to raise the flap at once to the upper position, (indicated in Fig. 1,) and pressure upon the bulb will be maintained as long as it is desired to continue the exposure. Then the pressure upon the bulb being released, the elasticity of the rubber walls of the bulb will cause the wall to resume its original position and will permit the piston 31 to descend in the cylinder and bring back to its original position the flap 23. If, however, it is desired, as is often the case, to give a longer exposure to that portion of the plate upon which the foreground of the scene will be pictured than upon that upon which the sky will be shown, the bulb will be pressed at the beginning of the exposure only sufficient to raise the flap to approximately the lower dotted position shown in Fig. 1, which will permit light to enter and fall upon the plate from the foreground, but will not expose the lower portion of the plate to the light from the sky, which is of much greater intensity, and therefore affects the plate in shorter time. After the plate has been exposed for a suitable period to the light from the foreground the shutter-flap 23 will be raised to the upper dotted position in Fig. 1 by additional pressure upon the bulb, and a short exposure of the plate to the light from the sky will be given before the flap is allowed to return to its normal position.

It is in the unequal exposure of the plate that the teeth 26 at the lower end of flap 23 have their utility, as without the provision of such teeth the partial opening of the shutter-flap 23 necessary to give longer exposure to the part of the plate on which the foreground is pictured would result in the production of a sharply-defined line across the plate. The teeth 26, however, act by diffraction in the manner well known in vignetting to prevent the formation of any distinct line across the plate and make it possible to avoid by this method the extreme contrasts which often result when an attempt is made in photographing landscapes to secure clear definition in the foreground and in the "highlights" of the picture.

For an instantaneous exposure the frame 16, with its attached structures, is swung into the position shown in Figs. 4 and 5 and held there by the spring-clip 28, as shown. The crank-shaft 11 is given a half-turn, so that the portion $11^b$ instead of being above the main portion $11^a$, as shown in Fig. 2, is below, as shown in Figs. 4 and 5. The lug $11^c$ is so thrown out of engagement with the opening $14^a$, and when the slide 8 is brought into the position shown in Fig. 4 the portion $11^b$ of the crank-shaft and the lug $11^c$ lie immediately above the end of the piston 31, so that pressure upon the bulb causing an upward movement of the piston will bring the foot of the piston into contact with the end of the crank-shaft and force the slide 8 upward. As will be noted from an examination of Fig. 4, when the slide is in its lower position the opening $8^a$ therein lies below the opening 6 in plates 3 and 5; but, as will be seen from an examination of Fig. 5, when the slide is at its upper position the opening $8^a$ lies above the opening 6. It is obvious, therefore, that in passing from the lower to the upper position the openings $8^a$ and 6 must come into registration for an instant, so that a quick pressure upon the bulb when the slide 8 and the shaft 11 are in the position shown in Fig. 4 will cause the slide to move rapidly upward to the position shown in Fig. 5, causing a very brief exposure of the plate to take place as the opening $8^a$ in the slide passes across the opening 6 in plates 3 and 5. As the slide 8 moves upward under the impulse from the piston 31 the portion $11^b$ of the crank-shaft slides over the lug $15^b$ and comes into contact with the lug $15^a$ above it. The spring 13, which engages with the flat side of block 12, yields as the portion $11^b$ of the shaft passes over the inclined surface of lug $15^b$; but as soon as the shaft passes above the lug the spring 13 returns the shaft to a position such that downward movement beyond the position shown in Fig. 5 is prevented by the engagement of the portion $11^b$ of the shaft with the upper end of lug $15^b$, as shown. To return the slide 8 to position for another exposure, the portion $11^b$ of the shaft is swung out of engagement with the upper end of lug $15^b$ and the slide is allowed to descend to the position shown in Fig. 4, it being understood that the plate must be withdrawn from the camera or the sensitive surface thereof protected during the return of the shutter-slide to its normal position.

It will be noted that the openings in plates 3 and 5 and in the slide 8 are rectangular instead of round, as is usual, the object of this form of opening being to secure proper lighting of the plate at its corners. The openings 6 and $8^a$ have sides in approximately the proportion usually given to plates, and as the light distributed over the plate consists of a multitude of overlapping images of the opening, it is evident that by means of a rectangular opening a somewhat more uniform distribution of the light at the corners of the plate is secured than with a round opening. Moreover, the light which with the round opening is admitted at the top, bottom, and sides cannot be effective upon the plate if the corners thereof are effectively lighted and the excess of light is a positive detriment. With rectangular openings this excess of light is cut off and the corners of the plate are effectively illuminated at the same time.

It will be observed that the shutter as described in the preceding paragraphs comprises but few parts, none of which are of such form and structure that they are liable to damage from use, and all of the operating mechanism is on the front surface of the shutter, where it is readily accessible at all times, both of which features of construction are of decided advantage from a practical point of view.

It is to be understood that while I have shown and described the elements of my invention in the preferred form of contour and arrangement I reserve the right to make such changes therein as do not depart from the spirit of the invention and lie within the scope of the appended claims.

Having thus described the construction and operation of my invention, what I claim as new, and desire to secure by Letters Patent, is—

1. The combination in a shutter of a supporting-frame having an opening, a shutter-flap pivotally mounted on the front of said frame and adapted to swing outward therefrom, a series of teeth at the free margin of said flap disposed substantially at right angles to the plane of said flap, and means for opening and closing said flap.

2. The combination in a shutter of a supporting-frame having an opening, a shutter-flap pivoted above said opening, a series of teeth at the lower margin of said flap disposed substantially at right angles thereto, and means for opening said flap so as to partially uncover said opening.

3. The combination in a shutter of a supporting-frame having an opening, a shutter-flap pivotally mounted above said opening, means for opening and closing said flap, said means comprising a lug on said flap having a cam-slot therein and a slidable member on said frame having an arm engaging said slot.

4. The combination in a shutter of a supporting-frame having an opening, a flap pivotally mounted above said opening, and means for opening and closing said flap comprising a lug mounted upon said flap and having a cam-slot, a pneumatic cylinder and piston on said frame, and an arm attached to said piston and adapted to engage said cam-slot.

5. The combination in a shutter of a supporting-frame having an opening, a flap pivotally mounted above said opening, and means for opening and closing said flap comprising a lug mounted on said flap and having a cam-slot, a cylinder attached to said frame, a piston slidable in said cylinder and having an arm engaging said cam-slot, means for imparting movement to said piston, and means for guiding and limiting the movement thereof.

6. The combination in a shutter of a main supporting-frame, a supplementary frame pivotally mounted thereon, a time shutter on said supplementary frame, an instantaneous shutter on said main frame, and means for operating each of said shutters.

7. The combination in a shutter of a main supporting-frame, a supplementary frame pivoted thereon, a time shutter mounted on said supplementary frame, catches on said main frame for holding said supplementary frame in operative or inoperative position, an instantaneous shutter mounted in said main frame, and means for operating said shutters.

8. The combination in a shutter of a main frame having a rectangular opening, a slide mounted in said main frame and having a similar opening, means for securing said slide with the opening therein in registration with the opening in said main frame, a supplementary frame adapted to surround the opening in said main frame, a flap pivoted on said supplementary frame, and means for opening and closing said flap.

9. The combination in a shutter, of a frame having an opening, a slide mounted for reciprocation in said frame and having a similar opening, a latch-bar adjustably mounted on said slide and adapted when in one position to engage the frame to hold said slide so that the opening in the slide registers with the opening in the frame and when in another position to hold the slide in position to cover and close the opening in the frame.

10. The combination in a shutter, of a frame having an opening, a slide mounted for reciprocation in said frame and having a similar opening, a latch adjustably mounted on said slide and adapted when in one position to hold the slide with its opening in registration with the opening in the frame and when in another position to hold the slide in position to close the opening in the frame, and resilient means for holding said latch in adjusted position.

11. The combination in a shutter, of a frame having an opening therein, a slide mounted for reciprocation in said frame and having a similar opening, a latch member rotatably mounted on said slide, a transversely-disposed lug on said latch member, and a spring adapted to engage said lug and hold the latch in position to lock the slide with its opening in registration with the opening in the frame or in position to close the opening in the frame.

12. The combination in a shutter, of a frame having an opening, a slide mounted for reciprocation in said frame and having a similar opening, a rotatable member transversely arranged upon said slide, and having a crank at the end thereof forming a latch, resilient means for holding said member against rotation, and lugs on said frame adapted to be engaged by said crank.

13. The combination in a shutter, of a frame having an opening, a slide mounted for reciprocation in said frame and also having an opening, a rotatable member transversely arranged on said slide and having a crank at one end thereof, resilient means for holding said member against rotation, a reciprocating member at one side of said frame adapted to engage said crank when said rotatable member is in one position to impart movement to said slide, means provided on said frame to limit the movement of said slide, and means to engage said crank when the slide reaches the end of its movement to prevent the return of the slide.

14. The combination in a shutter, of a frame having an opening, a slide mounted for reciprocation in said frame and also having an opening, a rotatable member transversely arranged on said slide and having a crank at one end thereof, resilient means for holding said member against rotation, a piston provided at one side of said frame and adapted to engage said crank when in one position to impart movement to said slide, a stop to engage said crank and limit the movement of said slide, and a curved lug presenting an inclined surface over which said crank may ride and adapted to prevent the return of said slide to its normal position after the completion of its movement.

In testimony that I claim the foregoing as my own I have hereto affixed my signature in the presence of two witnesses.

IRA M. MACY.

Witnesses:
DANIEL J. KOENIGSTEIN,
M. C. HAZEN.